United States Patent

Bishop et al.

[11] Patent Number: 6,124,650
[45] Date of Patent: Sep. 26, 2000

[54] NON-VOLATILE MEMS MICRO-RELAYS USING MAGNETIC ACTUATORS

[75] Inventors: David John Bishop, Summit; Sungho Jin, Millington; Jungsang Kim, Basking Ridge; Ainissa G. Ramirez, Chatham, all of N.J.

[73] Assignee: Lucent Technologies Inc., Murray Hill, N.J.

[21] Appl. No.: 09/418,874

[22] Filed: Oct. 15, 1999

[51] Int. Cl.[7] .................................................. H02K 33/10
[52] U.S. Cl. ............................ 310/40 MM; 310/DIG. 6; 335/78; 335/128; 335/79; 335/80
[58] Field of Search ....................... 310/40 MM, DIG. 6, 310/31; 335/78, 79, 80, 81, 82, 83, 84, 85, 86, 128

[56] References Cited

U.S. PATENT DOCUMENTS

| | | | |
|---|---|---|---|
| 5,327,033 | 7/1994 | Guckel et al. | 310/40 MM |
| 5,629,918 | 5/1997 | Ho et al. | 369/112 |
| 5,644,177 | 7/1997 | Guckel et al. | 310/40 MM |
| 5,945,898 | 8/1999 | Judy et al. | 335/78 |
| 5,994,986 | 11/1999 | Takahashi | 335/78 |
| 6,040,748 | 3/2000 | Gueissaz | 335/78 |

OTHER PUBLICATIONS

S. Jin, et al., High Frequency Properties of Fe–Cr–Ta–N Soft Magnetic Materials, published in Applied Physics Letters vol. 70, p. 3161, 1997.

Primary Examiner—Nestor Ramirez
Assistant Examiner—Thanh Lam

[57] ABSTRACT

An actuation device employing square-loop latchable magnetic material having a magnetization direction (polarization) capable of being changed in response to exposure to an external magnetic field is disclosed. The magnetic field is created by a conductor assembly with non-solenoid configuration. Once the magnetization direction of the material is so changed, the external magnetic field is no longer required to maintain the new magnetization direction. The latchable magnetic material is disposed on the mobile electrode of a switching device, and another magnetic material is disposed in spaced relation to the latchable magnetic material on a stationary electrode or surface. By applying an electrical current to a conductor assembly arranged proximate the latchable material, a magnetic field is created about the latchable magnetic material, to change the magnetization direction and thereby enable the attraction or repulsion of another magnetic material located on the stationary electrode. The resulting relative displacement of the mobile and stationary electrodes effects the selective connection or disconnection of electrical contacts carried on or associated with the respective electrodes of the actuation device without requiring additional power in order to maintain the switched state of the electrodes.

14 Claims, 3 Drawing Sheets

NON-VOLATILE MEMS MICRO-RELAYS USING MAGNETIC ACTUATORS

BACKGROUND OF THE INVENTION

1. Field of the Invention

The present invention relates to Micro Electro-Mechanical Systems (MEMS), and more particularly to the magnetic actuation of a MEMS micro-relay using latchable magnetic materials.

2. Description of the Related Art

Magnetic forces can be used to induce mechanical motion ("actuation") of magnetic materials. Electric current flowing through a conductor (e.g. a wire) induces a magnetic field around the conductor due to Faraday's law of induction (e.g. an electromagnet), and this mechanism is used to induce mechanical motion in many applications. Some implementation examples of electromagnetic actuation includes mechanical relays, bells used for fire alarm systems, and magnetic levitation trains.

Mechanical relays generally consist of a mobile mechanical electrode that is pulled into contact with a stationary electrode via magnetic force. In the most general implementation, a magnetic material is attached to the mobile electrode, and an electromagnet is positioned opposite the magnetic material on a stationary electrode or other stationary surface. Actuation of the electromagnet creates a magnetic field gradient that reacts with the magnetic field of the magnetic material attached to the mobile electrode and thereby causes the mobile electrode to be pulled or pushed (i.e. attracted or repelled) toward or away from the stationary electrode in a normally-open or normally-closed switch state of the relay, respectively.

Similar magnetic switching mechanisms have been used to actuate MEMS relays. In these applications, current flowing through an actuation coil pulls the mobile micro-machined electrode toward a stationary electrode. Although such an actuation mechanism can deliver large actuation forces, the current required to maintain the switch in the on-state requires undesirable dissipation of a large amount of power (e.g. hundreds of milliwatts) in the control circuit of the relay. Such high power dissipation limits the integration of MEMS relays into CMOS circuitry where the amount of power thus dissipated results in an operation bottleneck, and also prevents high-density integration of such relays.

The operation of relays with low power dissipation becomes important as the relay density increases. In MEMS-based relays, in particular, power dissipation is an important issue since the power handling capability of the substrates is limited. Prior art thermal actuators dissipate too much power (typically a few hundred milliwatts) because the induced temperature change must be maintained in order to secure the switch state. Similarly, prior art magnetic actuators utilizing magnetic fields from a current source also dissipate a large amount of power (typically a few hundred milliwatts) in that the applied magnetic field must be maintained in order to secure the switch state. In applications where non-volatile switching is necessary, there is currently no solution to this power dissipation problem for MEMS micro-relay implementation.

Electrostatic actuators use an applied voltage across a parallel-plate capacitor to induce an attractive force between the two plates and, as such, do not need to dissipate as much power as thermal and magnetic actuators to maintain a switched state, although the actuation voltage must be maintained. Since there is no current flow through a pair of capacitor plates, this actuation mechanism does not dissipate any power to maintain the actuation status (i.e. the switched status in a MEMS relay). There are, however, two drawbacks in this actuation scheme. The first is that although no power need be dissipated to maintain the switched status, the potential difference between the two capacitor plates must be maintained. Thus, a power failure causes the actuation status to be lost. The second drawback is that the force that can be provided by the electrostatic actuator is limited to a few micro Newtons, thereby limiting the application of such an actuator.

SUMMARY OF THE INVENTION

Soft magnetic materials typically exhibit continuously increasing magnetic induction (magnetization) as the magnitude of the applied magnetic field is increased. Conversely, they lose most of their magnetization when the applied field is removed. However, there are special types of magnetic materials which are easy to magnetize with relatively low magnetic fields as in the case of soft magnetic materials, but retain their magnetization with the removal of the external magnetic field as in the case of permanent (or hard) magnetic materials. Square-loop latchable magnetic material with a low coercive force displays properties that enable changing of the direction of magnetization (i.e. polarization) in the material by applying a small external magnetic field thereto. The value (or direction) of magnetization (i.e. polarization) of the latchable magnetic material remains constant even upon removal of the external magnetic field that is used to change its direction (See articles by S. Jin, et al., in High Frequency Properties of Fe—Cr—Ta—N Soft Magnetic Materials, published in *Applied Physics Letters* Vol.70 page 3161, 1997, and High-Remanance Square-Loop Fe—Ni and Fe—Mn Magnetic Alloys, in *IEEE Transactions on Magnetics*, Vol. MAG-16, page 1062, 1980, which are expressly incorporated herein by reference). The latching nature of the material magnetization provides an ideal mechanism for magnetic actuation, where the direction of the magnetization can be selectively reversed by operation of an electromagnet, without requiring additional power to maintain the magnetization direction (polarization) once it has been changed.

In accordance with a preferred embodiment of the present invention, the actuation device includes a mobile electrode having a first electrical contact and a stationary electrode having a second electrical contact. A square loop latchable magnetic material is disposed on one of the mobile and stationary electrodes and has a magnetization direction that can be changed in response to exposure to an external magnetic field. At least one current conductor is disposed in spaced relation to the latchable magnetic material such that an external magnetic field created by passing current through said at least one current conductor is capable of causing the magnetization direction of the latchable magnetic material to change to the opposite (or reverse) polarity. Once the magnetization direction has been reversed, the current applied through the at least one conductor may be discontinued. A second magnetic material is disposed opposite the latchable magnetic material and on the same plane as the second electrical contact. The second magnetic material is then selectively attracted to or repelled from the latchable magnetic material in response to the magnetization direction of the latchable magnetic material. In this manner, the first and second electrical contacts may be selectively connected and disconnected by changing the magnetization direction of the latchable magnetic material using the external magnetic field created by the at least one conductor.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar elements throughout the views.

DETAILED DESCRIPTION OF THE PRESENTLY PREFERRED EMBODIMENTS

The actuation mechanism according to the present invention provides suitable means to achieve both attractive and repulsive forces in a MEMS device while substantially eliminating the need for power dissipation to maintain the switched state. The direction of actuation force (i.e. attractive vs. repulsive) can be easily reversed by changing the direction of current flow through a set of control conductors. In principle, the control current need only to be supplied over a time duration in which the direction of magnetization (i.e. polarization) of the magnetic material is being reversed and latched, and the need for power dissipation is therefore eliminated when the actuation status is simply being maintained. Some exemplary applications for such mechanical actuation with low to no power dissipation include, without limitation, mechanical relays and reflecting light switches.

Figure 1A:
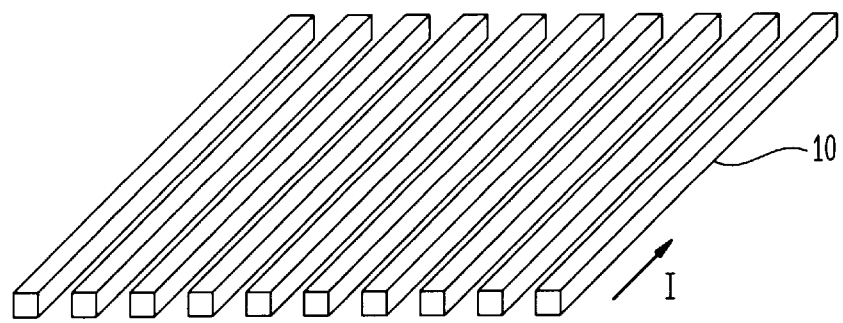
FIG. 1a is a schematic view of current carrying conductors according to an embodiment of the present invention.
Figure 1B:
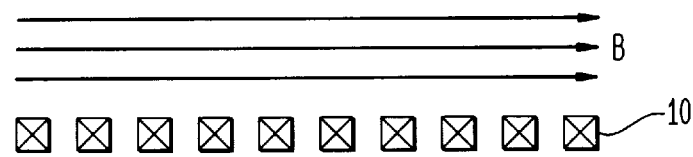
FIG. 1b is a cross-sectional view of the current carrying conductors of FIG. 1b.

While an electrically-generated magnetic field is usually produced by using solenoid windings, such a solenoid configuration is bulky and difficult to manufacture in small and flat-geometry devices. For micro-devices such as MEMS, a thin and compact design of field-generating components is essential. The present invention thus utilizes a novel concept of thin-film processed, parallel conductor assembly in which the magnetic field generated by individual conductors is locally combined or cancelled out so as to produce an overall, inplane, linear magnetic field suitable for actuation of latchable magnetic materials incorporated in the inventive device structures. FIGS. 1a and 1b depict an embodiment of one switchable configuration of a set of current carrying conductors 10 for use in providing the magnetic field H needed to change the direction of magnetization in the soft magnetic material. In this embodiment each conductor 10 can have a width ranging from about 0.1 $\mu$m to 10 mm, and a thickness ranging from about 0.1 mm to 100 $\mu$m. The conductor material may be selected from well-known, high conductivity metals and alloys such as based on Cu, Al, Au, Ag, Pt, Rh, Pd, Ru, or from superconducting materials such as Y—Ba—Cu—O and other materials. The number of conductors 10 that form a set can range from 1 to $10^6$, generally to cover the size of the device that is being actuated. When the number of conductors is greater than one, the gap between adjacent conductors may range from about 0.1 $\mu$m to 1 mm to achieve the proper magnetic field distribution for actuation. The flow direction of current I through each of the conductors at any given time is the same, so as to induce a quasi-uniform magnetic field in the vicinity of the set of conductors.

When a current I is passed through the set of conductors in the direction of the arrow shown by way of example in FIG. 1a, the surface current density K can be calculated from the net current I that is delivered through each individual conductor as:

$$K=nI,$$

where n is the number of conductors per unit length. At a height h above the conductors (where h is much smaller than the lateral width of the conductors), the magnetic field induced by the flowing current is parallel to the plane of current flow and perpendicular to the direction of flow as shown in FIG. 1b. The magnitude of the magnetic field H is given by $$H=\mu_0 K/2,$$

where $\mu_0$ is the magnetic permeability of a vacuum. This field strength is independent of the height h as long as h is very small compared to the lateral width of the conductors. For example, if the cross-section of each current-carrying conductor is 1 $\mu$m×1 $\mu$m and the separation between adjacent conductors is 1 $\mu$m, n=0.5/$\mu$m and H is about 3.14 Oersteds per mA of current in each wire. The magnetic flux density B depicted in FIG. 1b can be derived from the magnetic field intensity H through the vector relation B=$\mu$H, where t is the permeability constant of the magnetic medium.

Figure 2:
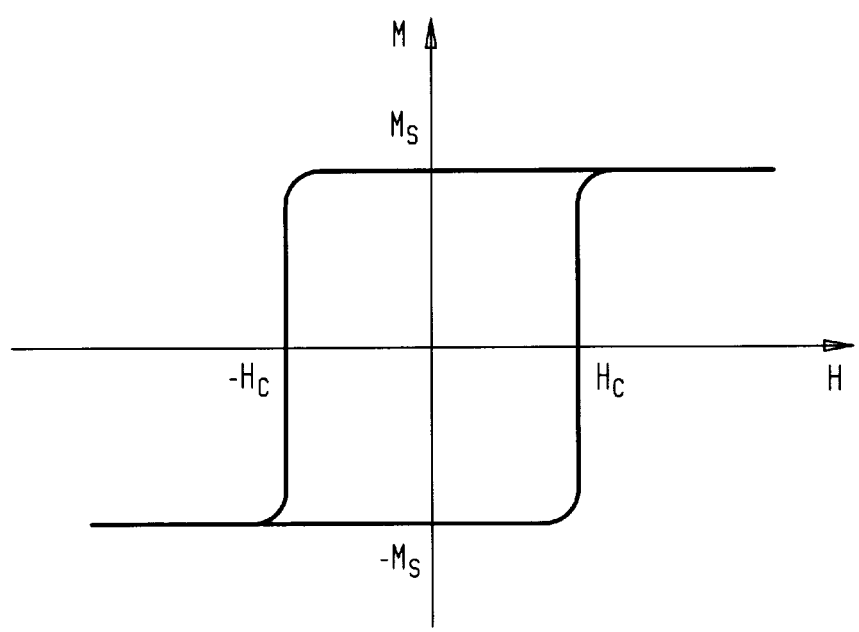
FIG. 2 is a graphical reprensentation of the magnetizing of square-loop latchable magnetic materials as a function of an applied magnetic field.

FIG. 2 graphically depicts the magnetization (magnetic intensity) M of a square-loop, latchable magnetic material as a function of applied magnetic field H. The magnetization of the material saturates at $M_s$, ranging from about 0.1 to 10000 gauss, when the external magnetic field exceeds a critical field strength $H_c$ ranging from about 0.1 to 10000 Oersteds, also known as the coercive field of the material. Even when the external field is removed, the magnetization remains near $M_s$. As the direction of the external magnetic field H reverses and the magnitude reaches the coercive field strength $-H_c$, the direction of magnetization changes and the magnetization saturates at $-M_s$. Upon removal of the external magnetic field, the magnetization remains at $-M_s$. Again, as the direction of the external magnetic field reverses and the magnitude reaches the coercive field strength $H_c$, the direction of magnetization reverts back to $+M_s$. The coercive field strength $H_c$ and the saturated magnetization $M_s$ of the magnetic material can be selectively engineered by tailoring the material and geometry of the magnetic thin film. The coercive field should be within the range that the current carrying conductors can provide, and the saturated magnetization should be sufficiently large to supply enough magnetic force for actuation.

With such latchable magnetic thin film placed atop of the current carrying conductors, the orientation of the external magnetic field seen by the thin film magnetic material due to the current flowing in the conductors can readily be reversed by changing the direction of current flow. When this structure (comprising the current carrying conductors and the thin-film soft magnetic material) is placed in proximity to another magnetic material, the magnetic force between the two magnetic materials can be switched from attractive to repulsive as a function of the magnetization direction (i.e. polarization) of the thin film magnetic material, and this force can be used to actuate small mechanical structures, including MEMS devices.

The coercive force ($H_c$), or the switching field, of the latchable magnetic films in the inventive devices should be within a desirable range. Too a high coercive would make it very difficult to switch with desirably low values of applied current, and too low a coercive force poses a danger of inadvertent magnetic switching and MEMS actuation by stray magnetic fields. The desired Hc value is in the range of 2–200 Oe, and preferably 5–50 Oe. High magnetic saturation in the latchable magnetic material is desirable, typically in the range of 1000–24000 gauss, and preferably 4000–24000 gauss. High squareness of the M-H loop of the latchable magnetic material is essential for efficient operation of the inventive latchable MEMS. The desired squareness, in terms of the ratio of remanent magnetization to saturation (Mr/Ms), is desirably at least 0.8, preferably at least 0.9, and even more preferably at least 0.95.

The latchable magnetic material is preferably in a thin film form directly deposited onto the MEMS structure. However, the use of non-thin-film approach is not excluded, e.g., attaching the magnetic material using micro-printing technology or using premade and pre-sized, very thin magnetic sheet material in combination with adhesive carrier ribbons. The deposition of magnetic thin films can be accomplished by physical vapor deposition such as sputtering, evaporation, by chemical vapor deposition, or by electrochemical deposition such as electroplating or electroless deposition. The latchable magnetic films can be selected from Fe—Ta—N, Fe—Cr—Ta—N, Fe—Zr—N, Co—Fe, Ni—Fe, FeCr—Co, and many other Fe, Co, or Ni base ferromagnetic films. The desired high-squareless loop and latchable characteristics can be imparted to the thin film magnetic materials by introducing magnetic anisotropy, e.g., by using oblique incidence deposition, magnetic field deposition, addition of exchange anisotropy, or by post-deposition heat treatment in a magnetic field. The desired thickness of the latchable magnetic film in the inventive MEMS structure is typically in the range of 0.1–200 micrometers, and preferably 1–50 micrometers. The shape of the magnetic film can be square, rectangular, oval, or any irregular configuration.

The two magnetic materials on the opposing sides of the MEMS relay structure can be both latchable. Alternative inventive designs include the case of one of two magnetic materials being soft magnetic (non-latchable), or permanent magnetic (non-switchable with the maximum switching field available in the MEMS device), as long as the opposing side of the relay comprises the latchable magnetic layer. The latchable, non-volatile characteristics of the relay operation remains the same although the specifics of magnetic actuation may have to be altered for optimal performance. Non-latchable, soft magnetic thin film material may be selected from a number of materials with low coercive force (e.g., <5 Oe) and low M-H loop squareness ratio (e.g., <0.5) such as Ni—Fe based alloys (well known as Permalloys), Co—Fe based alloys, Si—Fe alloys, amorphous magnetic alloys based on Fe, Ni or Co. Permanent magnet thin film materials may be selected from various alloys with high coercive force (e.g., >100 Oe) such as based on Sm—Co, Nd—Fe—B, Fe—Al—Ni—Co (known as Alnico), Fe—Cr—Co, Co—Fe—V (Vicalloy), Cu—Ni—Fe (Cunife).

Figure 3:
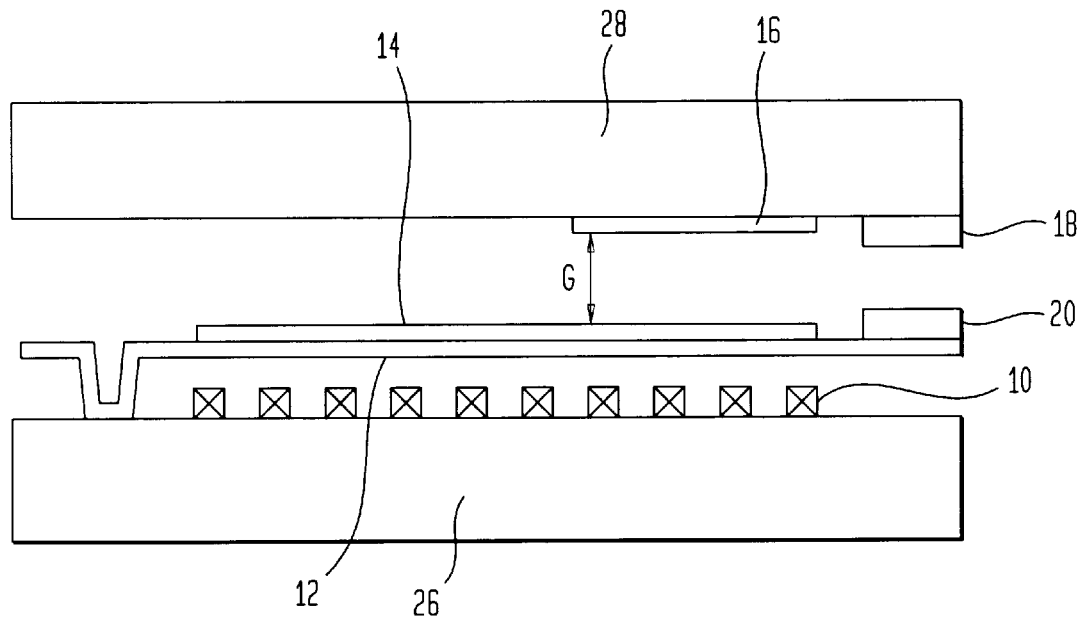
FIG. 3 is a schematic diagram of a magnetically actuated MEMS micro-relay in accordance with an embodiment of the present invention.
Figure 4:
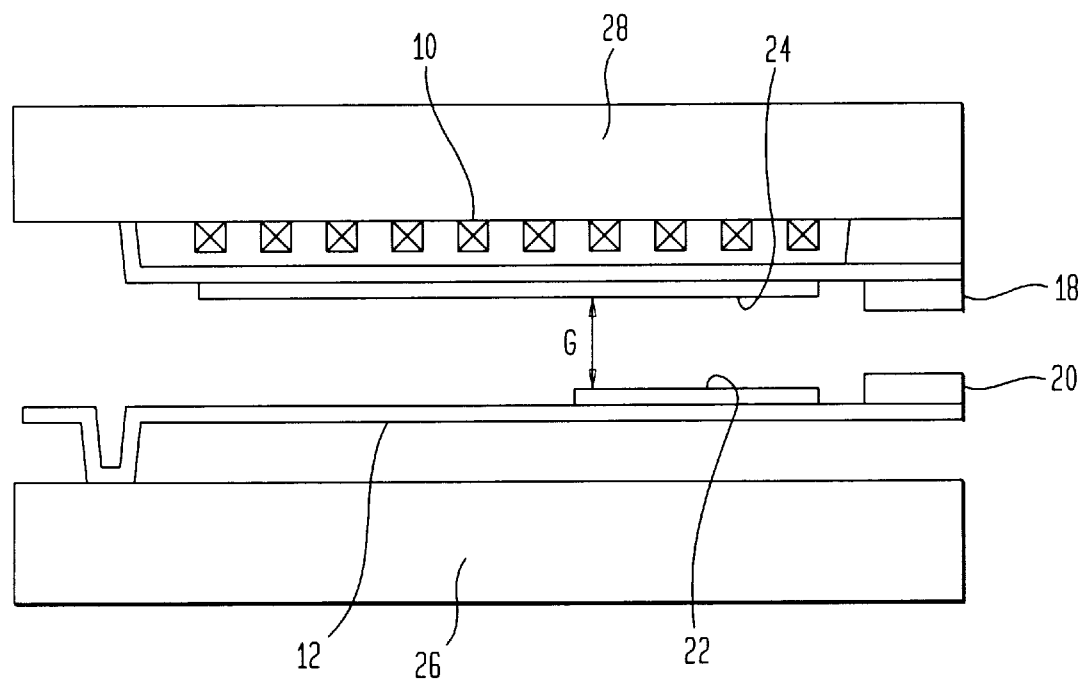
FIG. 4 is a schematic diagram of a magnetically actuated MEMS micro-relay in accordance with another embodiment of the present invention.
Figure 5:
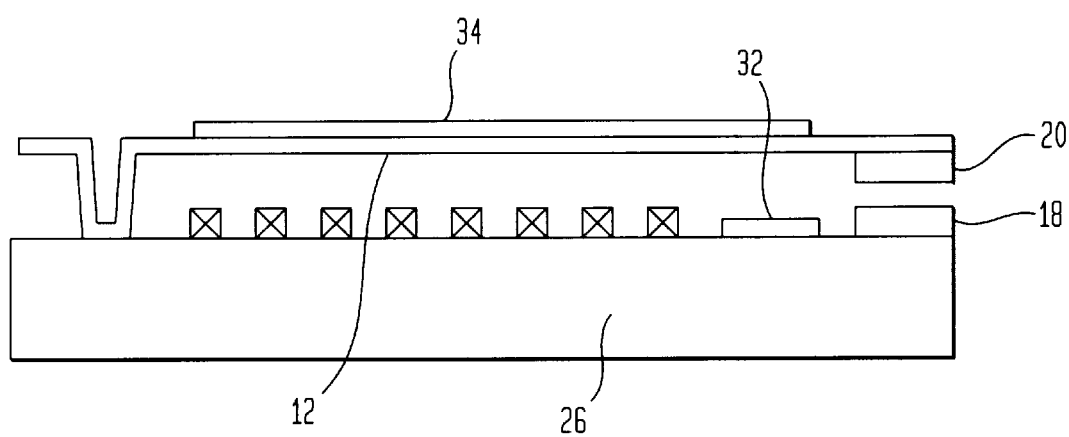
FIG. 5 is a schematic diagram of a magnetically actuated MEMS micro-relay in accordance with yet another embodiment of the present invention.

FIGS. 3, 4 and 5 depict alternative embodiments of implementations of the inventive actuation mechanism in a MEMS micro-relay. As is known in the art, the MEMS micro-relay structure is formed by a mobile mechanical cantilever 12 having a thickness ranging from about 0.05 to 100 microns, lengths ranging from about 1 to 10000 microns, widths ranging from 0.1 to 10000 microns, and a mobile metallic electrode 20 carried at the free end and having a size ranging from about 0.1 to 5000 microns on a side. Actuation of the mechanical cantilever 12 causes the same to move up and down as desired. When cantilever 12 moves up, the mobile metallic electrode 20 makes electrical contact with one or more fixed metallic contacts 18 having a size ranging from about 0.1 to 5000 microns generally conforming to that of the mobile electrode 20, to thereby establish an electrical connection therebetween. The electrical connection is broken when the mechanical cantilever 12 is displaced or moves down to create a size gap or spacing ranging from about 0.05 to 200 microns between the metallic electrodes 18 and 20. The contact geometry may be rearranged to suit the particular application so that, for example, the mobile metallic electrode 20 lies on the lower side of cantilever 12, and the fixed metallic electrode 18 lies on substrate 26 beneath cantilever 12 (FIG. 5). In that modification, cantilever 12 must when actuated be displaced downward to establish the connection, and upward to break it; in either case, the actuation mechanism should enable the mechanical cantilever 12 to move both up and down.

In the embodiment of FIG. 3, the current carrying conductors 10 are fabricated for location beneath mechanical cantilever 12, and may be disposed or carried directly on substrate 26. The latchable magnetic material 14 is carried atop cantilever 12 together with a mobile electrode or contact 20. The second magnetic material 16 of a high coercive field is placed above the latchable magnetic material 14 and is adhered to another substrate 28 or other stationary surface using, for example, flip-chip bonding. One of ordinary skill will nevertheless recognize that other suitable known bonding techniques may also be utilized without departing from the spirit and scope of the invention. The gap G between the two magnetic materials 14, 16 can range from about 0.05 to 500 microns. Thus, as the magnetization direction of the soft magnetic material 14 atop cantilever 12 is switched by changing the flow direction of current I in the underlying conductors 10, the two magnetic materials exert either mutually attractive or repulsive forces, resulting in the respective upward or downward displacement and motion of mechanical cantilever 12. The upward motion of cantilever 12 causes mobile electrode 20 to contact fixed electrode 18 and thereby actuate a switched state of the MEMS device. Corresponding downward motion of cantilever 12 effects disconnection electrodes 20 and 18 from each other.

FIG. 4 depicts an alternative embodiment of the invention in which the current carrying conductors 10 and the soft magnetic thin-film material 24 are placed on the same substrate as the fixed electrode 18, and the second magnetic material 22 with a high coercive field is located on the mechanical cantilever 12. The actuation mechanism is nevertheless identical to that of the embodiment shown in FIG. 3, despite the different relative locations of the two magnetic materials 22 and 24.

FIG. 5 depicts another alternative implementation of the actuating mechanism of the invention in which the flip-chip bonded substrate is eliminated by rearranging the electrodes and magnetic films. In this more compact design, the mobile electrode 20 is placed on the lower surface of the mechanical cantilever 12 and the soft-latchable magnetic material 34 is arranged on an upper surface of cantilever 12. The fixed electrode 18, second magnetic material 32 and conductors 10 are all carried on the surface of substrate 26 beneath mechanical cantilever 12. The actuation mechanism is in any event the same as that described in the embodiment of FIG. 3, except that it is the downward displacement or motion of cantilever 12 that brings electrodes 18 and 20 into physical and electrical contact.

While there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An actuation apparatus for a device including a mobile electrode having a first electrical contact and a stationary electrode having a second electrical contact, said actuation device comprising:

a latchable magnetic material disposed on one of the mobile and stationary electrodes and having a magnetization direction that is changeable in response to exposure to an external magnetic field;

at least one electrical conductor disposed in predeterminately spaced relation to said latchable magnetic material such that an external magnetic field created by passing electrical current through said at least one conductor exposes the latchable magnetic material to the created magnetic field to cause a change in the magnetization direction of said latchable magnetic material, said changed magnetization direction being maintained in the latchable magnetic material after the exposure to the created external magnetic field is discontinued; and a second magnetic material disposed on the other of the mobile and stationary electrodes and in predeterminately spaced relation to said latchable magnetic material so that said second magnetic material is one of attracted to and repelled from said latchable magnetic material in response to and as a function of the magnetization direction of said latchable magnetic material;

wherein the first and second electrical contacts may be selectively connected and disconnected by displacing the mobile electrode relative to the stationary electrode by selectively applying electrical current to said at least one conductor so as to create the external magnetic field to which the latchable magnetic material is exposed and thereby change the magnetization direction of said latchable magnetic material using the external magnetic field of the at least one conductor.

2. The apparatus in accordance with claim 1, wherein said second magnetic material is disposed on a plane on which said second electrical contact is disposed.

3. The apparatus in accordance with claim 1, wherein the actuation apparatus comprises a mechanical relay.

4. The apparatus in accordance with claim 1, wherein the actuation apparatus comprises a micro electro-mechanical system (MEMS) micro relay.

5. The apparatus in accordance with claim 1, wherein passage of the electrical current passed through said at least one conductor in a first direction creates a first external magnetic field that results in attractive forces between the latchable magnetic material and the second magnetic material, and wherein passage of the electrical current through said at least one conductor in a second direction opposite said first direction creates a second external magnetic field opposite in direction to the first magnetic field that results in repulsive forces between the latchable magnetic material and the second magnetic material.

6. The apparatus in accordance with claim 5, wherein the attractive forces cause relative movement of the mobile and stationary electrodes so that the first and second electrical contacts are relatively moved into contact with each other.

7. The apparatus in accordance with claim 6, wherein the repulsive forces causes relative movement of the mobile and stationary electrodes so that the first and second electrical contacts are relatively moved out of contact with each other.

8. The apparatus in accordance with claim 5, wherein the repulsive forces causes relative movement of the mobile and stationary electrodes so that the first and second electrical contacts are relatively moved into contact with each other.

9. The apparatus in accordance with claim 8, wherein the attractive forces causes relative movement of the mobile and stationary electrodes so that the first and second electrical contacts are relatively moved out of contact with each other.

10. The apparatus in accordance with claim 4, wherein said at least one conductor comprises a parallel conductor assembly in the MEMS micro-relay, wherein the magnetic field created by each of said at least one parallel conductor is one of locally combined and cancelled out so as to produce an in-plane magnetic field suitable for actuation of the latchable magnetic material.

11. The apparatus in accordance with claim 1, wherein the magnetic field created by said at least one conductor comprises a coercive force in a range of 2–2000 Oersteds.

12. The apparatus in accordance with claim 1, wherein the latchable magnetic material comprises a magnetic saturation in a range of 1000–24000 gauss.

13. The apparatus in accordance with claim 1, wherein said latchable magnetic material comprises one selected from a group consisting of Ta—N, Fe—Cr—Ta—N, Fe—Zr—N, Co—Fe, Ni—Fe, Fe—Cr—Co, Fe based ferromagnetic films, Co based ferromagnetic films and Ni based ferromagnetic films.

14. The apparatus in accordance with claim 1, wherein said second magnetic material comprises at least one permanent thin film material selected from a group consisting of Sm—Co, Nd—Fe—B, Fe—Al—Ni—Co, Fe—Cr—Co, Co—Fe—V and Cu—Ni—Fe.

* * * * *